United States Patent [19]

Wang et al.

[11] Patent Number: 5,814,801

[45] Date of Patent: Sep. 29, 1998

[54] MAXICODE DATA EXTRACTION USING SPATIAL DOMAIN FEATURES EXCLUSIVE OF FOURIER TYPE DOMAIN TRANSFER PROCESSING

[75] Inventors: Ynjiun P. Wang; Angi Ye, both of Fort Myers, Fla.

[73] Assignee: Metanetics Corporation, Bothel, Wash.

[21] Appl. No.: 742,367

[22] Filed: Nov. 1, 1996

Related U.S. Application Data

[62] Division of Ser. No. 456,113, May 31, 1995, Pat. No. 5,637,849.

[51] Int. Cl.[6] ............................. G06K 7/10; G06K 7/14; G06K 19/06
[52] U.S. Cl. ......................... 235/454; 235/462; 235/464; 235/494
[58] Field of Search ................................... 235/454, 462, 235/464, 494

[56] References Cited

U.S. PATENT DOCUMENTS

| | | | |
|---|---|---|---|
| 4,874,936 | 10/1989 | Chandler et al. | 235/494 |
| 4,998,010 | 3/1991 | Chandler et al. | 235/494 |
| 5,153,418 | 10/1992 | Batterman et al. | 235/494 |
| 5,189,292 | 2/1993 | Batterman et al. | 235/494 |
| 5,241,166 | 8/1993 | Chandler | 235/494 |
| 5,302,813 | 4/1994 | Goren | 235/462 |
| 5,449,893 | 9/1995 | Bridgelall et al. | 235/462 |
| 5,515,447 | 5/1996 | Zheng et al. | 235/494 |

*Primary Examiner*—Donald T. Hajec
*Assistant Examiner*—Jacob Eisenberg
*Attorney, Agent, or Firm*—Kenneth P. Robinson

[57] ABSTRACT

Prior methods of reading MaxiCode dataforms have been subject to reduced resolution image scaling and processing and speed constraints of Fourier transform computations. Described spatial domain data extraction methods provide bull's eye center location by T-sequence pixel pattern analysis, axis identification by moment analysis of data cell pairs, and integral width square wave analysis of illumination transitions to avoid reading-line cell fragmentation. The center and top of a MaxiCode are identified in high-resolution pixel data, without scaling reduction or Fourier type frequency domain processing. Data is extracted serially from rows of data cells by sampling along lines of pixels aligned by fragmentation analysis so as to traverse complete rows of data cells. Dynamic thresholding accurately defines illumination value transitions between adjacent linear groups of data cells, each group consisting of one or more data cells of the same reflectivity. Application of disclosed methods to other types of dataforms is described.

16 Claims, 7 Drawing Sheets

$T_{seq}$ A, A, A, A, B, B, A, A, A, A

MAXICODE DATA EXTRACTION USING SPATIAL DOMAIN FEATURES EXCLUSIVE OF FOURIER TYPE DOMAIN TRANSFER PROCESSING

This application is a division of application Ser. No. 08/456,113, filed May 31, 1995 now U.S. Pat. No. 5637,849.

This invention relates to the extraction of data encoded in dataforms and, more particularly, to improved methods of extracting data from MaxiCode dataforms without frequency domain transforms.

BACKGROUND OF THE INVENTION

The application and use of dataforms, including common forms of bar codes, are extensive and growing. For present purposes, "dataform" is defined as including all arrangements whereby data is fixed in some form of machine readable copy. Typically dataforms comprise patterns of elements of differing reflectivity (black and white, for example) which can be printed on labels and other items. Basic aspects of encoding, reading or data extraction and decoding of dataforms are well known.

A MaxiCode is a form of two-dimensional dataform which includes a bull's eye target in the center of the dataform and a fixed number of hexagonal data cells surrounding the bull's eye pattern. A MaxiCode is shown in FIG. 1. A binary encoding protocol is utilized to represent encoded data by arrangements of black and white data cells. FIG. 2 is a diagrammatic map of the data cells of a MaxiCode. As shown, there are included 18 orientation cells marked "B" and "W" surrounding the bull's eye (which would be in the center). Of these orientation cells, those marked B are always black or of low reflectivity and those marked W are always white or of higher reflectivity. The known markings of these orientation cells enables determination of which of the four outer edges is the top edge of a MaxiCode. The remaining data cells can be black or white as determined by the data to be stored in a particular MaxiCode.

A dataform reader, whether using laser or image based technology, is typically programmed to implement a particular reading protocol designed for use with a specific form of dataform, such as a MaxiCode. Decoding normally includes two basic steps. The first is data extraction which includes processing image data to determine the black or white reflectivity characteristic of each dataform cell. The second step is decoding based on the binary black or white value of each data cell. For example, a MaxiCode label as illustrated includes 866 hexagonal data cells each having a binary 1 (black) or 0 (white) value. Data extraction includes processing image data representative of illumination reflected from a MaxiCode positioned in a target area in order to generate 866 bits of binary data. Decoding includes processing the binary data to recover the data file originally encoded in compressed or other form into the binary values of the data cells of the MaxiCode.

BACKGROUND ON MAXICODE DATA EXTRACTION

A typical prior MaxiCode data extraction method includes the following steps. First, locate the MaxiCode in the image area. Second, scale the MaxiCode image into a square bit mapped image area of 128×128 pixels. Third, find the three principal MaxiCode axes by use of Fourier transform techniques. Fourth, determine a grid location for each data cell by use of inverse Fourier transform techniques. Fifth, superimpose the grid locations onto the scaled image area. Sixth, use the grid locations to extract the binary value of each cell.

The method as described inherently involves a tradeoff between resolution level versus the level of data processing and processing time involved. Scaling to 128×128 pixels limits resolution and affects accuracy of results. Because of the high levels of processing required for Fourier transforms, doubling the resolution quadruples the processing time. Increasing the resolution to 512×512 pixels would increase processing time by a factor of at least 16. Increased processing time decreases operational effectiveness of a reader. Also, Fourier transform operations require use of a floating point processor, increasing cost and power consumption as compared to a fixed point processor. General background information relating to MaxiCodes is provided in U.S. Pat. No. 4,998,010 issued March 5, 1991. For present purposes, a "MaxiCode type of dataform" is a dataform as illustrated in FIGS. 1 and 2 or as otherwise described in said patent, subject to inclusion of features or characteristics as described in particular implementations herein.

In view of the foregoing, objects of the present invention are to provide new and improved methods of extracting data from MaxiCode and other types of dataforms which are characterized by one or more of the following capabilities:

data extraction using spatial domain features;

data extraction at relatively high resolution levels;

data extraction without Fourier transform processing;

bull's eye center location by intersection of diameters identified by unique T-sequence;

dataform axis identification by use of data cell moment determinations;

dataform axis identification by use of normalized cell traversal; and data cell sampling orientation by reference to normalized cell traversal.

SUMMARY OF THE INVENTION

In accordance with the invention, a method of extracting data from a MaxiCode type of dataform, having a bull's eye pattern and a pattern of similarly aligned hexagonal data cells including orientation cells, includes the following steps:

(a) providing pixel data for an image area, the pixel data representative of illumination reflected from the MaxiCode;

(b) locating the center of the bull's eye pattern by sampling lines of pixel data to identify two intersecting diameters of the bull's eye pattern, each diameter identified by a pixel data T-sequence pattern uniquely characteristic of a bull's eye diameter;

(c) determining, by moment analysis of a portion of the pixel data, the orientation of a least one MaxiCode axis normal to sides of hexagonal data cells, such orientation corresponding to the derived moment of a group of data cells in side-to-side straight line alignment;

(d) determining the alignment of the top of the MaxiCode in said image area, based upon the location of a plurality of said orientation cells relative to the location of the bull's eye center, and extracting data from data cells of the MaxiCode by sampling image data along lines aligned with a MaxiCode axis; and (e) decoding the extracted data to recover information encoded into the MaxiCode.

Also in accordance with the invention, in step (c) the axis orientation may alternatively be determined on the basis of being aligned with a reference line defined by sampling image data to identify a traversal line of image data characterized by illumination value transitions spaced along such line only at integral multiples of data cell width, the traversal line thereby being normal to sides of a sequence of dark and light hexagonal data cells.

For a better understanding of the invention, together with other and further objects, reference is made to the accompanying drawings and the scope of the invention will be pointed out in the accompanying claims.

DESCRIPTION OF THE INVENTION

Figure 1:
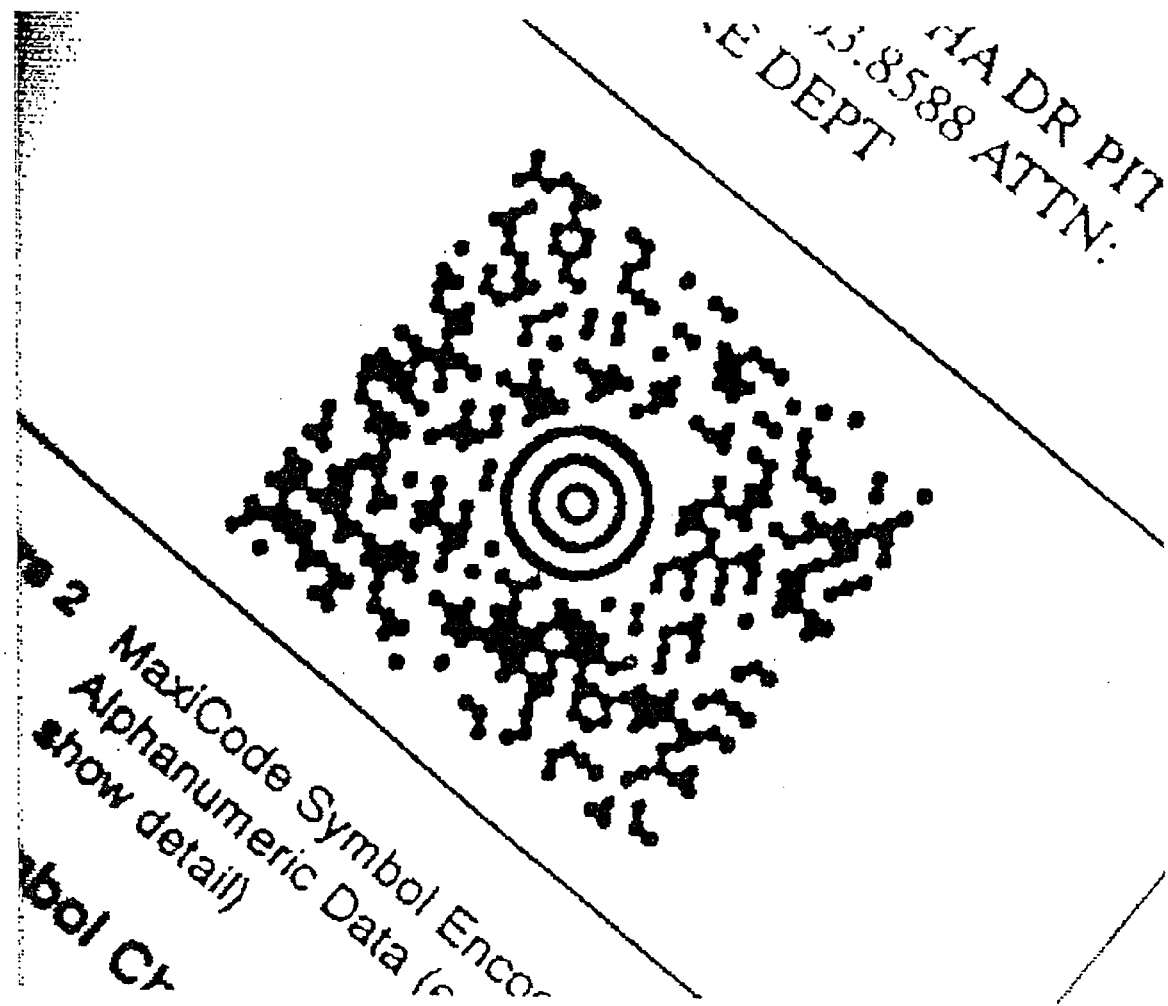
FIG. 1 is a view of a typical MaxiCode label.
Figure 2:
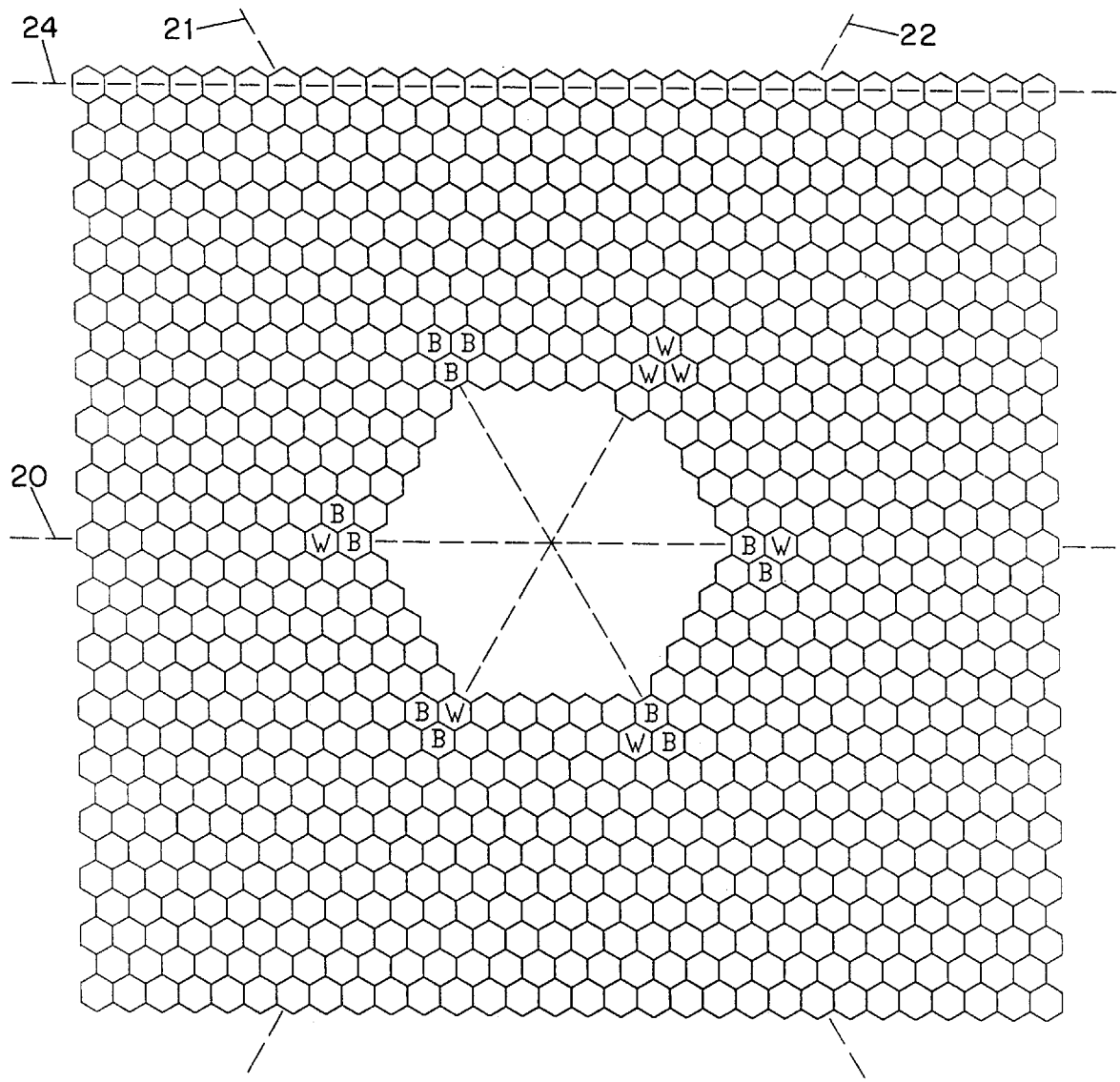
FIG. 2 illustrates MaxiCode data cell layout.
Figure 3:
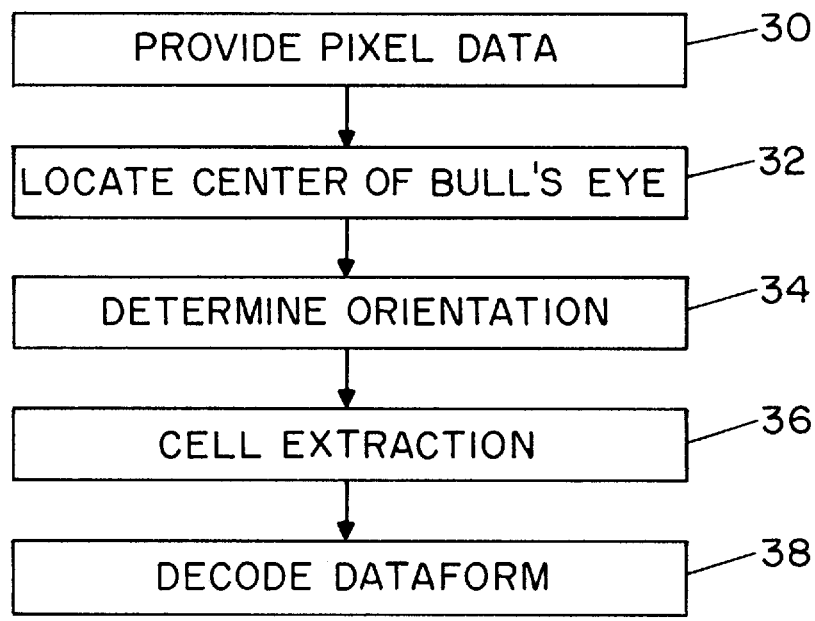
FIG. 3 is a flow chart useful in describing an embodiment of the invention.

FIG. 3 is a flow chart useful in describing an embodiment of a data extracting method in accordance with the invention. After an initial description of the method, implementation of individual steps will be considered in greater detail. This embodiment is particularly adapted to extracting data from a MaxiCode type of dataform having a central bull's eye pattern and a pattern of similarly aligned hexagonal data cells, including orientation cells, as shown in FIGS. 1 and 2. The implementation and use of dataform readers are sufficiently well developed so that skilled persons are capable of carrying out physical implementation of arrangements for providing image data representative of reflected illumination and for general types of processing of image data and other data by microprocessor for image analysis, data extraction and data decoding purposes. For description of relevant system configurations reference is made to copending application Ser. No. 08/332,592, filed Oct. 31, 1994 and assigned to the assignee hereof. Aspects of implementation particular to the present invention will be covered in description of particular features and method steps.

Referring to FIG. 3, at step 30 pixel data is provided for an image area. By use of laser, two-dimensional CCD imaging or other suitable technology, pixel data representative of illumination reflected from a MaxiCode type of dataform such as shown in FIG. 1 is stored in memory or otherwise made available. Typically, the pixel data will represent an image area including all or a major portion of the dataform.

At step 32 the center of the bull's eye pattern of FIG. 1 is located by sampling lines of pixel data. As will be further described with reference to FIGS. 4A and 4B, T-sequence sequence values for the spacing between either successive black to white or successive white to black transitions for a line of pixels passing through the center of the bull's eye provide a sequence pattern A,A,A,B,B,A,A,A. For all lines crossing the bull's eye, this T-sequence pattern is uniquely characteristic of a diameter of the bull's eye (a diameter, by definition, passing through the center of a circular figure). By sampling lines of pixel data to identify two intersecting diameters, the center of the bull's eye is located as the point of intersection of the diameters.

Figure 5:
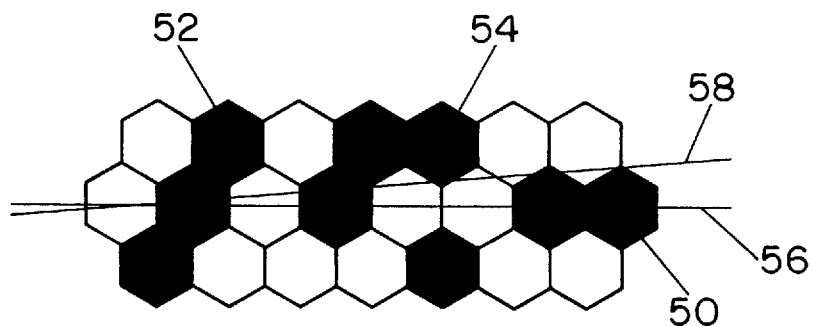
FIG. 5 shows an image area including a coded portion of a MaxiCode.

At step 34, the orientation of the MaxiCode is determined on the basis of the orientation of at least one axis thereof. With reference to FIG. 2, for present purposes the axes of a MaxiCode are defined as the three straight lines 20, 21 and 22, shown dashed in FIG. 2, which pass through the MaxiCode at 120 degree separations. As thus positioned and defined, each MaxiCode axis is normal to sides of hexagonal data cells through which it passes. The path of an axis through one or more data cells in this manner will also be referred to as normalized cell traversal, in view of the perpendicular relationship of the axis to the cell sides in point. Data is encoded in a MaxiCode by altering the reflectivity of specific data cells in a binary coding protocol, so that a dark and light pattern of cells as illustrated in part in FIG. 5 may result. Within this pattern, groups of cells may be presented in side-to-side straight line alignment. In FIG. 5, two data cells are shown in such alignment at 50 and three data cells are so aligned at 52. For definitional purposes, side-to-side straight line alignment is not exhibited by the three cell pattern at 54 in FIG. 5. Since each axis 20, 21 and 22 is normal to sides of the hexagonal data cells, when a group of two or more data cells are in side-to-side straight line alignment (as at 52 or 54) the principal dimension of the group of cells will lie along a straight line aligned with or nominally parallel to one of the MaxiCode axes 20, 21 or 22.

Taking advantage of these characteristics, moment analysis may be implemented as will be further described to enable determination of the orientation of a MaxiCode axis, based upon correspondence to the derived moment of a group of data cells in side-to-side straight line alignment. In the present context, the effectiveness of moment analysis is enhanced by the fact that the profile shape of a combination of two or more data cells is known in advance. With derivation of a moment line and the knowledge that an axis will pass through the center of the MaxiCode (center of the bull's eye pattern) parallel to the moment line, an axis orientation is determined. With knowledge that all three of the MaxiCode axes pass through the center with 120 degree separations, the orientation of each of the three axes 20, 21 and 22 is determined.

The alignment of the top of the MaxiCode within the image area can then be determined. With reference to FIG. 1, it will be appreciated that a MaxiCode label such as illustrated may have any orientation, so that the orientation of the MaxiCode pixel data within the image area will initially be unknown. In implementation of the MaxiCode dataform format, the orientation cells (marked B or W in FIG. 2) are coded black or white in a predetermined manner as initially described. Such coding of the group of orientation cells enables determination of the location of the top of the MaxiCode relative to the center of the MaxiCode. With the bull's eye center and MaxiCode axis orientation as previously determined, the location of a plurality of the orientation cells relative to the location of the center can be used to determine which of the three axes 20, 21 and 22 is aligned with the top of the MaxiCode image within the image area. With reference to the MaxiCode orientation illustrated in FIG. 2, it will be seen that the top of the MaxiCode is horizontally aligned and that the horizontally oriented axis 20 is aligned with the top of the MaxiCode.

Figure 6A:
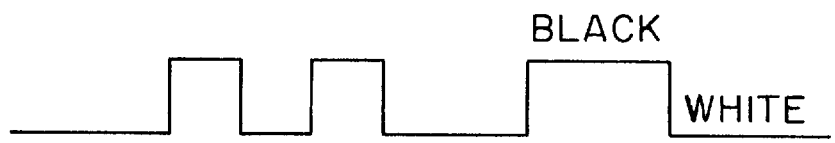
FIG. 6A and 6B illustrate reflectivity differentiated transitions along pixel paths through the FIG. 5 image area.

At step 36 a line of pixels is identified for normalized cell extraction of the top line (or other line of data cells aligned with the top) of the MaxiCode. Dashed line 24 in FIG. 2 represents the alignment of a typical line of pixels for such normalized sampling of the top row of data cells of the Maxicode. Techniques for determining whether a line of pixels has a normalized alignment relative to a row of data cells will be further described with reference to FIGS. 5, 6A and 6B. Basically, in FIG. 5 line 56 is normalized with respect to the series of dark and light data cells through which line 56 passes perpendicularly to the data cell sides which it intersects. Line 58, on the other hand, is not normalized with respect to the data cells. For definitional purposes, whether a line of pixels is "normalized" can be determined on the basis of the spacing of illumination value transitions as a line of pixels (such as line 56) passes through a series of dark and light data cells. As shown in FIG. 6A, for normalized line 56 the square wave representing passage through dark and light image areas along pixel line 56 is characterized by illumination value transitions spaced along the line at integral multiples of a determinable unit of spacing (such unit being the width of a single data cell). When the pixel line passes through a single dark or light data cell sandwiched between opposing light or dark cells, respectively, the transitions as represented here by vertical lines are spaced by one unit of cell width.

Figure 6B:

When a normalized pixel line passes through a group of contiguous light or dark cells the transitions are spaced by integral multiples of the cell width. There are no transition spacings at other than integral multiples of the width of one data cell. Conversely, for non-normalized line 58, FIG. 6B illustrates resulting non-integral spacing of illumination value transitions as line 58 passes obliquely through cell sides of upward and downward pointing angled portions of data cells as illustrated in FIG. 5. Thus, if a line of pixels passes through an entire row of data cells of a MaxiCode with a resulting illumination value transition pattern transitions spaced only by integral multiples of a unit of spacing as in FIG. 6A, the line of pixels will be defined as "normalized". Consistent with this, a line is defined as being "nominally normal" to cell sides, so long as all cells of a row are traversed by the line, without intersecting any cell of an adjacent row. Thus, a normalized line may not actually be perfectly perpendicular to the cell sides. The important consideration being whether the pixel line passes through all data cells of interest in a row to provide an integral multiple spacing pattern for data extraction purposes, not whether absolute perpendicularity is achieved.

Data is then extracted from data cells of the MaxiCode by sampling pixel data along lines of pixels aligned with a MaxiCode axis (e.g., by sampling along normalized lines of pixels). Sampling is effective to extract data in the form of binary values for the arrangement of the black or white reflectivity-differentiated data cells. As extracted, the binary value data sequence is typically stored in memory locally or remotely for decoding or other use. While data extraction may typically begin for the top line of data cells along a line of pixels parallel to the horizontal MaxiCode axis, data extraction may begin or proceed with other rows of data cells by sampling along lines of pixels parallel to one of the other axes. In this context, the "parallel" relationship should also be more closely addressed. It will be understood that a label may be placed on a curved or other non-planar surface, or may be imaged in an oblique or distorted manner. As a result, for an upright MaxiCode the horizontal axis may not actually be parallel to either of the top or bottom rows of data cells. In such a case, the top row of data cells must be sampled by an angled row of pixels, the middle row of data cells can be sampled by a horizontal row of pixels, and intermediate rows of data cells can be sampled at angles appropriately interpolated between the top angle and horizontal. Alternatively or in addition, a normalization check routine as discussed above may be implemented for individual rows of data cells (in order to accurately determine the line angle required for a normalized traversal of the data cells) on a self-synchronous row-by-row or other basis. While sampling along curved or other non-linear rows of data cells will not be addressed in detail, appropriate arrangements can be implemented by skilled persons once having an understanding of the invention.

At step 38 the extracted data is decoded by use of an appropriate MaxiCode decoding protocol, which can be carried out in a known manner locally or at a remote point after transmission of data.

DETAILED OPERATION

Aspects of operation and implementation of the invention will be described in additional detail.

Locating the center of the bull's eye includes sampling the gray level values for a line of pixels in the image area. The gray level values are dynamically thresholded to accurately determine the transition points between black areas and white areas. Dynamic thresholding in handling transition segments pursuant to the invention is based upon dividing a gray scale spectrum into at least two different sub-spectrum portions. A different noise threshold is designated for each gray scale sub-spectrum portion. Whether a segment is considered to be noise or considered to represent an illumination value transition along a line of image data is dependent upon whether the segment magnitude exceeds noise thresholds of one or more sub-spectrum portions applicable to the segment. The process may be characterized as follows:

(w) determine a segment magnitude representing the difference between adjacent high and low gray scale values;

(x) subdivide the gray scale into at least two sub-spectrum portions;

(y) designate a noise threshold for each of the sub-spectrum portions of the gray scale; and (z) utilize the segment magnitude as representative of an illumination value transition on a line of pixel data, provided the segment magnitude exceeds a noise threshold applicable to the segment. Dynamic thresholding thus conceptually includes plotting a histogram of the absolute values of each signal segment.

Figure 7A:
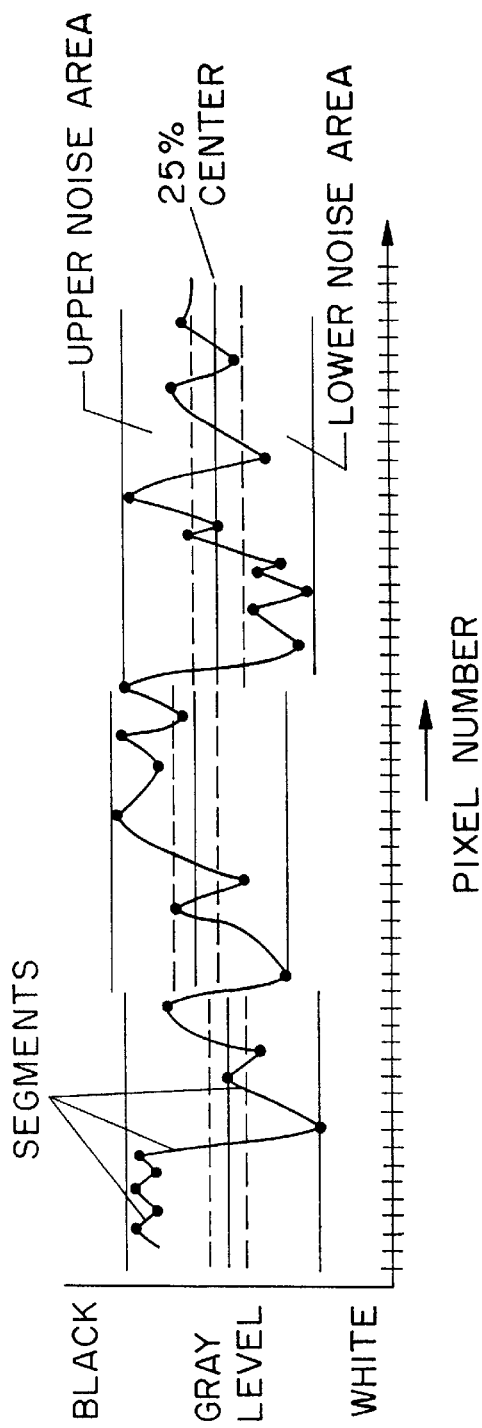
FIG. 7A illustrates a histogram type reflectivity transition analysis technique in accordance with the invention and FIG. 7B shows a related noise level designation.
Figure 7B:
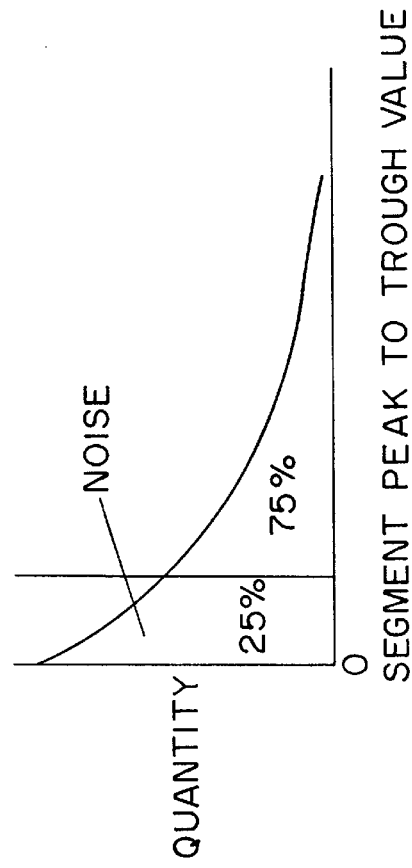

As shown in FIG. 7A, a "signal segment" is the difference in gray scale value between adjacent peaks and troughs of the signal. Many of the segments will typically be small and represent noise and therefore a noise threshold is determined. In accordance with a preferred embodiment of the invention, the segment magnitude that corresponds to 25% of the area under the histogram curve is defined as the noise threshold, as represented in FIG. 7B. Additionally, the two ends or limits of the gray scale spectrum that correspond to black and white may contain noise that does not correspond to a transition, but, lower magnitude segments that occur in the intermediate gray scale values may be transitions. To make this determination, the gray scale domain is conceptually divided into an upper noise area, a transition area and a lower noise area on a local basis, as shown in FIG. 7A. In this example, the transition area is chosen to be 25% of the total local area. Once the noise threshold is determined and the local transition area is determined, location of the black/white transition points is accomplished as follows:

1) If the segment magnitude is greater than the noise threshold, then linearly interpolate the segment and the transition is determined to be at the halfway point.
2) If the segment magnitude is less than the noise threshold and the segment is entirely within the upper or lower noise area, then ignore the segment, it is noise.
3) If the segment magnitude is less than the noise threshold and the segment is partially within the transition area, then linearly interpolate the segment and the transition is determined to be at the halfway point.

Figure 4A:
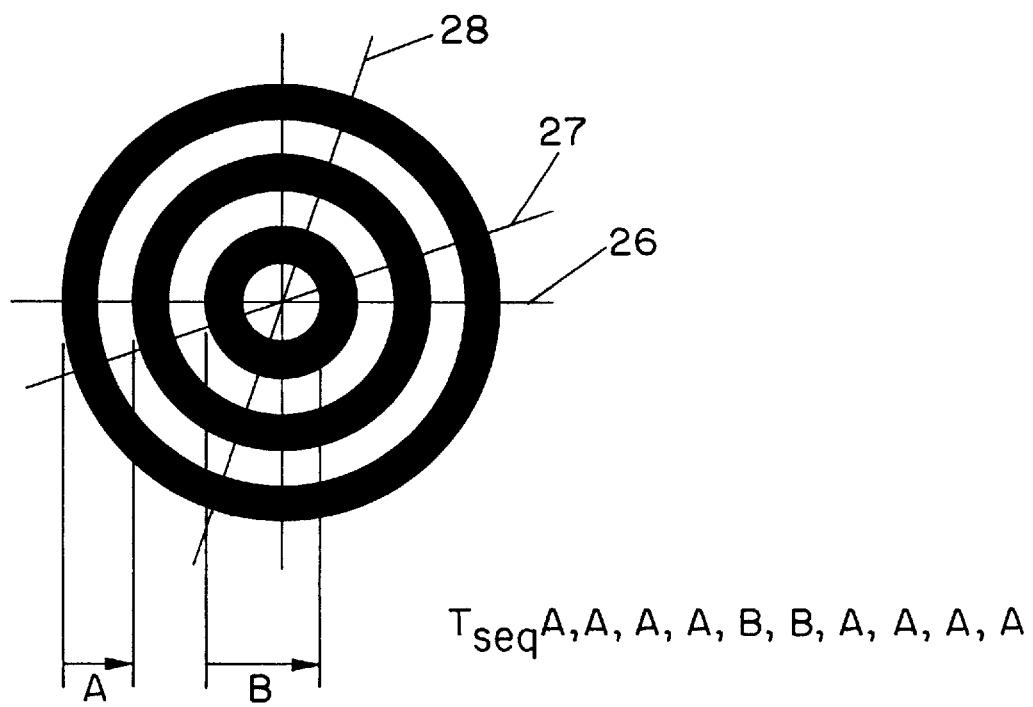
FIG. 4A shows a central bull's eye portion of a MaxiCode and FIG. 4B illustrates T-sequence designations.
Figure 4B:
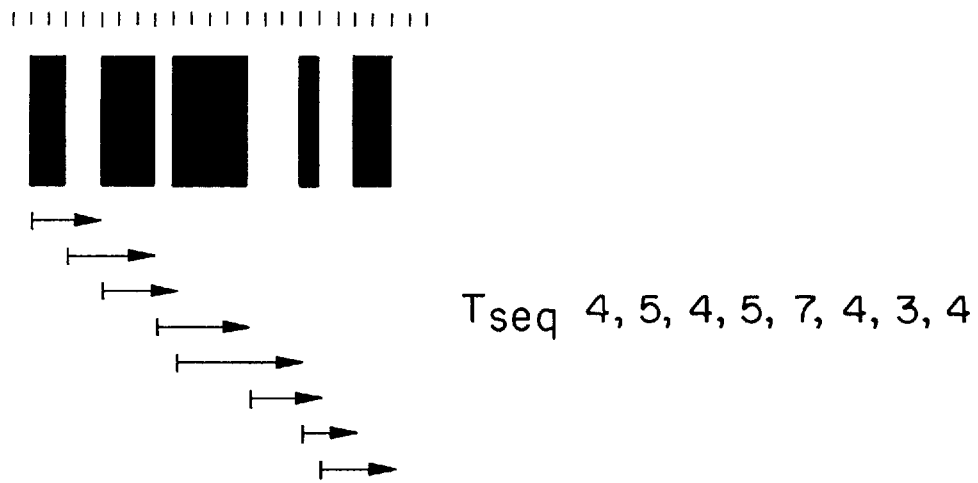

Once all of the transition points are determined, a T-sequence for the line of pixel data is calculated. FIG. 4B conceptually illustrates how the T-sequence is calculated for a series of black/white transitions. Each value of the T-sequence represents the distance between two successive transitions from black to white or two successive transitions from white to black. If the chosen line of pixels 26 happens to cross through the center of the bull's eye, the T-sequence of the line will include the sequence pattern A,A,A,B,B,A, A,A as shown in FIG. 4A. If such a pattern is not found, a different line of pixels is chosen to look for the center of the bull's eye. If such a pattern is found, the center of the bull's eye at a certain X,Y location is determined by sampling one or more groups of pixels such as the pixels forming lines 27 and 28 that intersect at the point X,Y as also shown in FIG. 4A. If each of these lines also includes the same sequence pattern A,A,A,B,B,A,A,A, then the center location of the bull's eye is confirmed. Because the size of the data cells in a MaxiCode is proportional to the size of the bull's eye, the actual values of A and B can be used to calculate the size of the data cells and the entire label. It will be noted that each line which intersects the bull's eye at its center can be defined as a diameter for present purposes.

Figure 8:
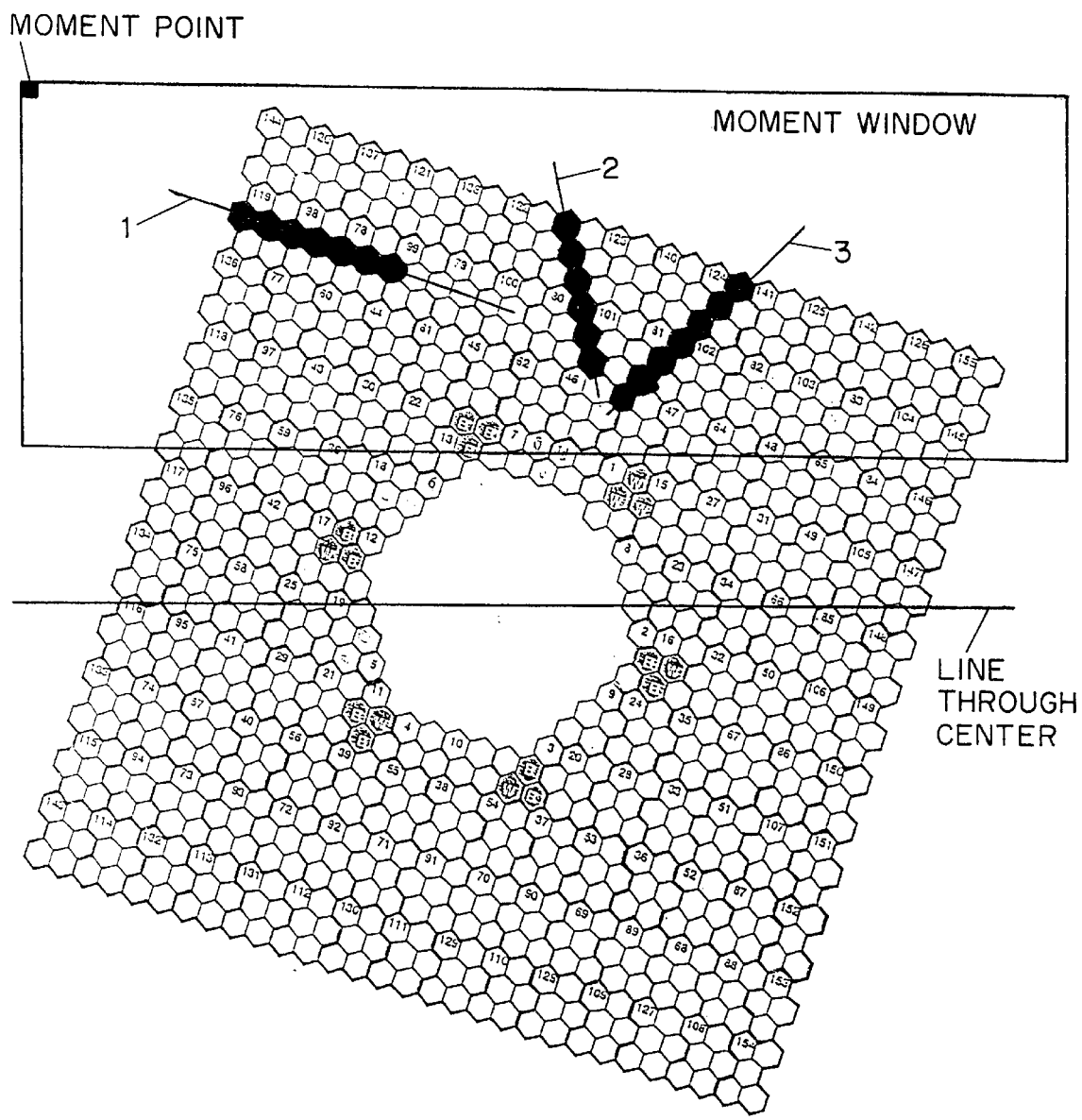
FIG. 8 illustrates straight line image cell groupings for moment analysis within a moment sampling window.

To determine the orientation of the three principal axes of the MaxiCode, a moment window is selected above the located bull's eye as indicated in FIG. 8 and the moment of binary black objects (a group of one or more dark dataform cells) within the window is calculated. The dimensions of the window can be determined based on the calculated size of the MaxiCode.

Conceptually, calculating the moment of the black objects is the same as calculating the moment of a physical object except that a unit value of 1 for a black pixel and a unit value of 0 for a white pixel are used instead of an object's discrete mass. Mathematical theory describes how, based on second order moments calculated for an object, the object's principal axis of symmetry can be calculated. See generally Computer Vision by Ballard Brown, Prentice-Hall, Inc. (1992), page 255, equation 8.19. As discussed above, the principal axis of two adjacent MaxiCode cells (or more than two cells in side-to-side straight line alignment) will correspond to a line parallel to one of the three principal axes of the MaxiCode as represented in FIG. 8. Each MaxiCode cell comprises a fixed quantity of pixels and the principal axis is calculable for an object comprising two adjacent cells. If an object has too many black pixels or too few black pixels, it is not a good object to choose for the moment calculation. It has been found effective to employ threshold values based on the quantity of pixels corresponding to 1.5 cells and the quantity corresponding to 2.5 cells for selection of a side-by-side pair of black data cells to determine the principal axis of such two-cell object and thereby a principal axis of the MaxiCode.

After determining the three principal axes, the positions of the 18 orientation cell locations can be calculated and the black or white value of each can be extracted for use in determining the location of the top of the MaxiCode relative to the center of the bull's eye.

To begin extracting binary cell data it may be desirable that the alignment of the principal axis that runs horizontally through the MaxiCode be more accurately determined. This can be done by normalized sampling of the group of pixels that represent this line across the center of the MaxiCode and determining the illumination value transition locations as discussed earlier. If the sampled line accurately passes through the center of the MaxiCode, all transitions will occur at integral multiples of the cell size. If the pixel line alignment is not normalized, fragments will be found as shown in FIG. 6B. If fragmenting is found, the angle of the line of pixels is adjusted and a new line is tested for fragmenting. When a non-fragmented line is found, the black/white pattern across the center of the MaxiCode is aligned with (nominally parallel to) the principal axis, which in turn is parallel to or nominally parallel to the top of the MaxiCode (depending on imaging distortion, etc.).

After identifying that principal axis, a group of pixels representing a line of pixels aligned with that axis at a spacing from the center calculated to cross the centers of the top row of cells is sampled. Again, the line can be tested for fragmenting. If fragmenting is found, the angle is adjusted for normalized traversal, if not, the cell data for the top row is extracted. Each subsequent row between the top and the center is then scanned by selecting a group of pixels that form a line through the row. The process is repeated to find the bottom row and each subsequent row in the bottom half of the code. As noted, a row by row or otherwise initiated normalization check routine may be employed.

While the foregoing detailed description is instructive of a currently preferred implementation of a method in accordance with the invention, many variations and different step sequences suitable for particular applications will be apparent to skilled persons. For example, with an understanding of the invention determination of axis orientation may be satisfactorily accomplished in some applications without the use of moment analysis. As described, fragmenting analysis to determine if a line of pixels has been normalized so as to extend nominally perpendicularly to sides of a row of data cells is effective to identify a traversal line which is aligned with or nominally parallel to a MaxiCode axis. Once the orientation of one MaxiCode axis is determined, the alignment of the top of the MaxiCode parallel to one of the three axes can be readily determined in view of the preceding description. A line of pixels traversing each data cell of the top row of cells can then be designated and data extraction implemented. Many other modifications to the described method, such as extracting data from rows in an order different from that described, etc., will also be apparent.

For example, while the invention has been described with particular reference to MaxiCode types of dataforms, other types of dataforms also include geometric patterns of dark and light color coded polygonal data cells, typically regular polygons which are of common size, shape and orientation. The Code 1 and DataMatrix types of dataforms include such regular polygons in the form of squares, as will be further described with reference to FIGS. 9A and 9B. Such types of dataforms may also incorporate acquisition patterns having certain characteristics of the bull's eye pattern discussed with reference to MaxiCodes. Examples of methods which may be used in the extracting of data from a dataform having a pattern of rows of similarly aligned polygonal data cells (each of which methods begins with providing pixel data representative of reflected illumination) include the following.

A first method includes determining the orientation of at least one dataform axis. The axis orientation is determined on the basis of the axis being aligned with a reference line defined by sampling pixel data to identify a traversal line of pixel data characterized by illumination value transitions spaced along the traversal line at integral multiples of a data cell width, as described above. The traversal line is thereby nominally normal to sides of a sequence of dark and light cells each having a width between two parallel sides.

A second method also includes determining the orientation of at least one dataform axis. The axis orientation is determined by moment analysis of a portion of the pixel data and corresponds to the derived moment of a contiguous group of data cells of the same reflectivity value (dark or light). Typically, the moment determination utilizes two data cells of common size, shape and orientation which are in contiguous side-to-side relationship, as described.

A third method is applicable to a dataform with an acquisition pattern including a series of elements of predetermined relative dimensions and differing reflectivity values. The acquisition pattern is identified by sampling lines of pixel data to identify at least one traversing line intersecting the acquisition pattern and having a pixel data T-sequence pattern characteristic of the particular acquisition pattern. The T-sequence pattern of the MaxiCode bull's eye has been described and other acquisition patterns have other characteristic T-sequence patterns.

Each of these methods may include further steps whereby data is extracted from the dataform subsequent to use of the axis orientation or acquisition pattern identification as respectively provided by these methods.

Figures 9A, 9B:
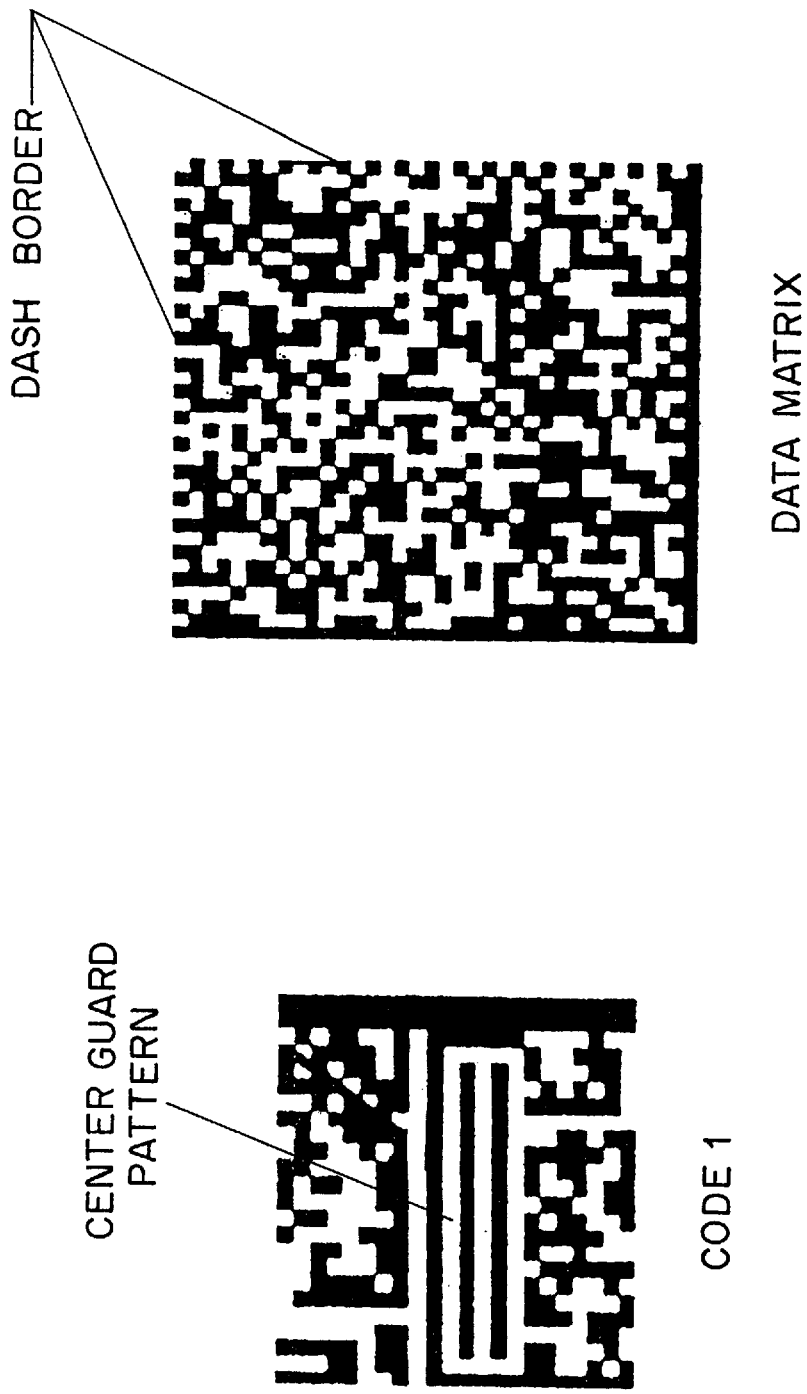
FIGS. 9A and 9B illustrate other types of dataforms including patterns of polygonal cells to which the invention is applicable.

With reference to FIG. 9A, it will be seen that the Code 1 dataform as illustrated includes an acquisition pattern in the form of what is termed a center guard pattern. As shown, this pattern includes four white and three black elongated horizontal bars. A line of pixel data passing through all seven of these bars at a 90 degree or other angle to horizontal will provide a T-sequence pattern represented by X,A,A,A,A, A,Y wherein both X and Y are equal to or greater than A. The seven bar acquisition pattern of the Code 1, as shown, takes up a large portion of the dataform and is recognizable for traversal lines over a wide range of angles through the dataform. The Code 1 acquisition pattern is thus easy to find and identify. After locating and identifying a Code 1 dataform, a moment calculation utilizing pixel data along one of the black bars of the pattern can be used to orient the dataform.

Identifying the acquisition pattern of a DataMatrix dataform, such as shown in FIG. 9B, is more difficult. The characteristic pattern of two solid and two hatched borders of alternating light and dark squares is easily discernible by the human eye, but more difficult to identify by sampling lines of pixel data. The probability that on a random basis a line of pixel data will longitudinally traverse an edge pattern so as to exhibit a black and white, or wholly black reflectivity pattern is very small. One way to identify the presence of a DataMatrix is to confirm the presence of some type of dataform and then if no other type of dataform is identified, the unknown dataform can be assumed to be a DataMatrix and attempted to be decoded as such. The invention is applicable in implementing such decoding by identifying a dataform axis through moment analysis using two side-to-side contiguous data cells as described above, for example. Histogram type analysis can also be used to identify a DataMatrix based on the presence of a pattern of regular hexagonal data cells in the form of squares. Of course if the edge of a DataMatrix is located, a traversal line of image data parallel to and closely spaced from the edge will exhibit either a solid black pattern or an alternating black and white pattern characterized by illumination value transitions spaced at integrals of the data cell width. Pursuant to the invention, such a uniform spacing of illumination value transitions can be used both to identify the dataform as a DataMatrix and also to enable data extraction by sampling pixel data along lines nominally parallel to the first traversal line and spaced so as to traverse rows of color coded data cells located within the borders of the FIG. 9B dataform. The invention is thus applicable to a variety of types of dataforms which include patterns of a regular polygon shape.

In addition, with an understanding of the invention, which departs from prior Maxicode data extraction methods, skilled persons will be enabled to employ techniques introduced for image analysis and data extraction relating to other types of dataforms in application of the invention to data extraction from MaxiCode types of dataforms. While certain of such techniques have not been directly applicable to use with MaxiCodes, features of the present invention facilitate their use in methods implemented pursuant to the invention.

While there have been described the currently preferred embodiments of the invention, those skilled in the art will recognize that other and further modifications may be made without departing from the invention and it is intended to claim all modifications and variations as fall within the scope of the invention.

What is claimed is:

1. A method of extracting data by processing a MaxiCode type of dataform entirely in the spatial domain exclusive of Fourier type domain transfer processing, said dataform including a pattern of similarly aligned hexagonal data cells, comprising the steps of:
   (a) providing pixel data for an image area, said pixel data representative of illumination reflected from said hexagonal data cells;
   (b) determining the orientation of a plurality of said hexagonal data cells positioned in a row in side-to-side straight line alignment;
   (c) extracting data from said plurality of hexagonal data cells by sampling said pixel data along a line traversing each data cell of said plurality; and
   (d) processing said extracted data to recover information encoded in said dataform, independently of use of Fourier type processing in any step of said method.

2. A method as in claim 1, wherein in step (b) said orientation is determined by moment analysis of a portion of said pixel data, said orientation corresponding to the derived moment of two hexagonal data cells of said plurality which are contiguous and of the same reflectivity.

3. A method as in claim 1, wherein in step (b) said row of hexagonal data cells is aligned with a reference line defined by sampling said pixel data to identify a traversal line of pixel data characterized by illumination value transitions spaced along said traversal line at integral multiples of data cell width.

4. A method of extracting data from a MaxiCode type of dataform, having a pattern of similarly aligned hexagonal data cells of differing reflectivity values, comprising the steps of:
   (a) providing pixel data for an image area, said pixel data representative of illumination reflected from said hexagonal data cells;

(b) determining the orientation of a plurality of said hexagonal data cells positioned in a row in side-to-side straight line alignment;

(c) sampling image data from said plurality of hexagonal data cells along a line traversing each data cell of said plurality; and (d) extracting data from said image data sampled in step (c) by determining spacings of illumination value transitions between data cell groups along said line, each said data cell group consisting of one or more contiguous data cells of similar reflectivity value.

5. A method as in claim 4, wherein in step (b) said orientation is determined by moment analysis of a portion of said pixel data, said orientation corresponding to the derived moment of two hexagonal data cells of said plurality which are contiguous and of the same reflectivity.

6. A method as in claim 4, wherein in step (b) said row of hexagonal data cells is aligned with a reference line defined by sampling said pixel data to identify a traversal line of pixel data characterized by illumination value transitions spaced along said traversal line at integral multiples of data cell width.

7. A method of extracting data from a dataform having a pattern of rows of similarly aligned lighter and darker data cells of a regular polygon shape, comprising the steps of:

(a) providing pixel data for an image area, said pixel data representative of reflected images of said data cells;

(b) determining, by moment analysis of a portion of said pixel data, the orientation of a normal traversal line having an alignment normal to sides of a series of said data cells positioned in a row in side-to-side straight line alignment;

(c) sampling image data from a plurality of said data cells along a sampling line traversing each data cell of said plurality; and (d) extracting data from said sampled image data.

8. A method as in claim 7, wherein said dataform is a MaxiCode type of dataform.

9. A method as in claim 7, wherein step (b) comprises determining said orientation as the derived moment of two data cells which are contiguous and of similar reflectivity.

10. A method as in claim 7, wherein step (b) comprises determining said orientation as the derived moment of a group of data cells in side-to-side straight line alignment.

11. A method as in claim 7, wherein step (c) comprises sampling image data along a sampling line having one of the following orientations: aligned with and parallel to said normal traversal line; aligned with said normal traversal line at an angular separation of an integral multiple of 60 degrees.

12. A method as in claim 7, wherein step (d) comprises extracting data by determining spacings of illumination value transitions between data cell groups along said sampling line, each said data cell group consisting of one or more contiguous data cells of similar reflectivity value.

13. A method of extracting data from a dataform having a pattern of rows of similarly aligned lighter and darker data cells of a regular polygon shape, comprising the steps of:

(a) providing pixel data for an image area, said pixel data representative of reflected images of said data cells;

(b) determining, by the presence of illumination value transitions spaced at integral multiples of data cell width, the orientation of a normal traversal line having an alignment normal to sides of a series of said data cells positioned in a row in side-to-side straight line alignment;

(c) sampling image data from a plurality of said data cells along a sampling line traversing each data cell of said plurality; and (d) extracting data from said sampled image data.

14. A method as in claim 13, wherein said dataform is a MaxiCode type of dataform.

15. A method as in claim 13, wherein step (c) comprises sampling image data along a sampling line having one of the following orientations: aligned with and parallel to said normal traversal line; aligned with said normal traversal line at an angular separation of an integral multiple of 60 degrees.

16. A method as in claim 13, wherein step (d) comprises extracting data by determining spacings of illumination value transitions between data cell groups along said sampling line, each said data cell group consisting of one or more contiguous data cells of similar reflectivity value.

* * * * *